(12) United States Patent
Bialke et al.

(10) Patent No.: US 10,274,011 B2
(45) Date of Patent: Apr. 30, 2019

(54) ELECTRODYNAMICALLY FINISHED PLAIN BEARINGS

(71) Applicant: Goodrich Corporation, Charlotte, NC (US)

(72) Inventors: William Edward Bialke, Trumansburg, NY (US); Eric Hansell, New Milford, CT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/668,669

(22) Filed: Aug. 3, 2017

(65) Prior Publication Data
US 2019/0040907 A1 Feb. 7, 2019

(51) Int. Cl.
*F16C 33/14* (2006.01)
*F16C 17/10* (2006.01)
*F16C 33/10* (2006.01)
*B23H 9/00* (2006.01)

(52) U.S. Cl.
CPC .............. *F16C 33/14* (2013.01); *B23H 9/00* (2013.01); *F16C 17/10* (2013.01); *F16C 33/109* (2013.01); *B23H 2200/10* (2013.01); *F16C 2220/68* (2013.01); *F16C 2231/00* (2013.01); *F16C 2380/26* (2013.01)

(58) Field of Classification Search
CPC ....... B23H 9/00; B23H 2200/10; F16C 33/14; F16C 2231/00
See application file for complete search history.

(56) References Cited

U.S. PATENT DOCUMENTS

| 2,782,160 A |   | 2/1957  | Treuhaft et al. |           |
|-------------|---|---------|-----------------|-----------|
| 3,547,796 A |   | 12/1970 | Randall         |           |
| 3,900,374 A | * | 8/1975  | Haggerty        | B23H 3/00 |
|             |   |         |                 | 204/224 M |
| 4,601,801 A |   | 7/1986  | Fukuda et al.   |           |
| 5,906,535 A |   | 5/1999  | Tonooka et al.  |           |
| 6,176,998 B1| * | 1/2001  | Wardle          | B23H 3/00 |
|             |   |         |                 | 205/652   |

(Continued)

FOREIGN PATENT DOCUMENTS

| JP | 2017015228 A  | 1/2017 |
|----|---------------|--------|
| KR | 20170009072 A | 1/2017 |
| WO | 2017034788 A1 | 3/2017 |

OTHER PUBLICATIONS

Extended European Search Report, prepared by Examiner, of the European Patent Office, dated Oct. 19, 2018, issued in corresponding European Patent Application No. 18186854.8.

*Primary Examiner* — Thomas R Hannon
(74) *Attorney, Agent, or Firm* — Locke Lord LLP; Daniel J. Fiorello; Scott D. Wofsy

(57) ABSTRACT

A method of electrodynamically finishing a plain bearing includes electrically separating a bearing housing from a journal shaft with a lubricant disposed on a bearing surface of the bearing housing. The bearing housing or the bearing housing is rotated relative to the other and a voltage differential applied across the bearing housing and the journal shaft. One or more asperities disposed on the bearing surface are eroded with electric discharge events between the journal shaft and the bearing housing. Electrodynamically finished bearing assemblies and reaction/momentum wheel arrangements having such bearing assemblies are also described.

20 Claims, 6 Drawing Sheets

(56) References Cited

U.S. PATENT DOCUMENTS

| | | | |
|---|---|---|---|
| 6,461,486 B2 | 10/2002 | Lorincz et al. | |
| 6,896,416 B2 | 5/2005 | Matsuzaki | |
| 7,255,778 B2 * | 8/2007 | Mori | B23H 3/00 |
| | | | 204/212 |
| 7,374,644 B2 | 5/2008 | Butterfield et al. | |
| 9,322,109 B2 * | 4/2016 | Langlais | B23H 11/003 |
| 2009/0321274 A1 * | 12/2009 | Comaty | B23H 9/00 |
| | | | 205/649 |
| 2010/0043742 A1 * | 2/2010 | Erdmann | B23H 3/00 |
| | | | 123/197.3 |

* cited by examiner

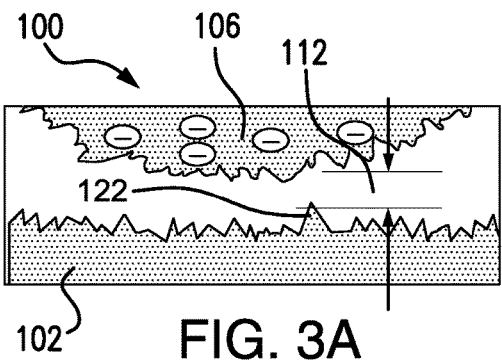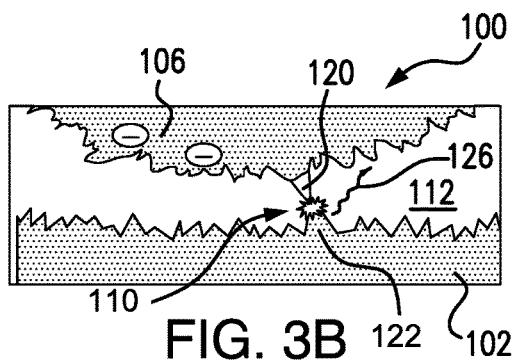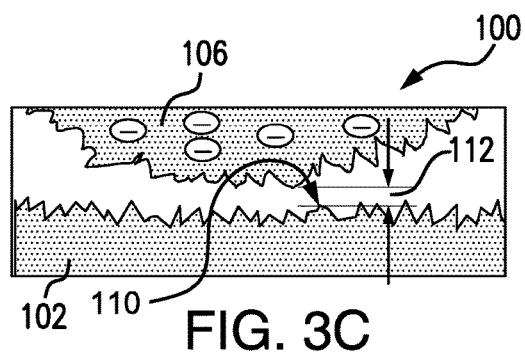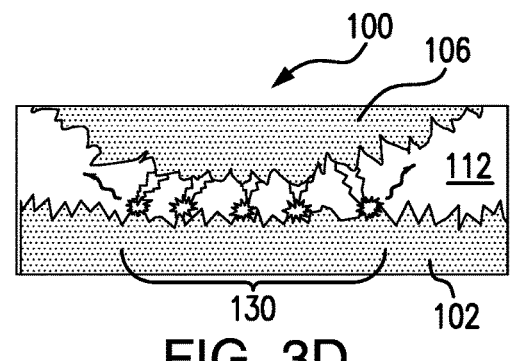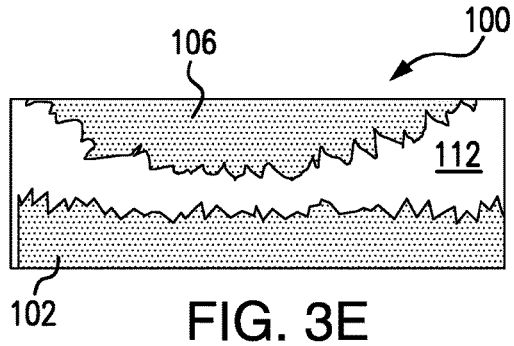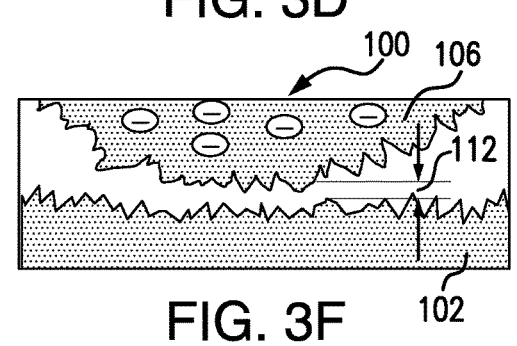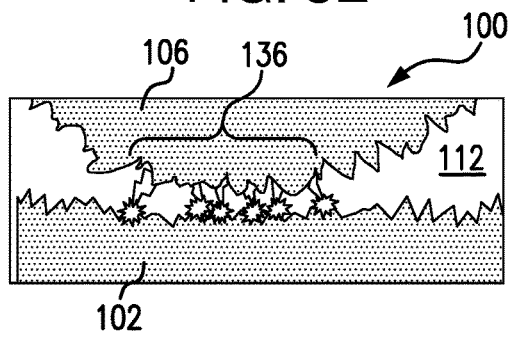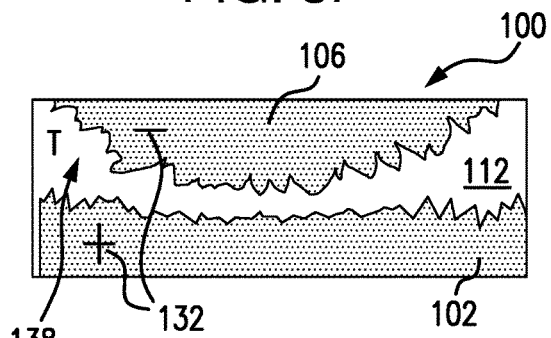

ELECTRODYNAMICALLY FINISHED PLAIN BEARINGS

BACKGROUND OF THE INVENTION

1. Field of the Invention

The present disclosure relates to plain bearings, and more particularly to plain bearings with electrodynamically finished bearing surfaces.

2. Description of Related Art

Plain bearings, such as thrust and journal bearings, are commonly used to support loads. Such bearings generally have a rotatable structure like a shaft that is rotatably supported relative to a bearing surface. When stationary and during rotation load is communicated through an interface located between the rotatable structure and the bearing surface. Bearings typically include lubricant which is carried into the interface during rotation to limit friction between the rotatable structure and the bearing surface in the interface.

During rotation the lubricant forms an elasto-hydrodynamic layer (EHD) within the interface between the rotatable element and the bearing surface. The EHD layer communicates the supported load between the rotatable structure and the bearing surface. In some bearings either or both the rotatable structure and bearing surface can have form error, i.e., deviation from an intended curvature and ideal surface condition, delaying formation of the EHD layer between the rotating structure and bearing surface during start of rotation, rotation stop, and during low speed rotation. Delay of EHD layer formation can increase wear due to friction between the contacting rotating structure and bearing surface, potentially reducing reliability and service life of the bearing.

Existing journal bearing and methods of making bearings have generally been considered satisfactory for their intended purpose. However, there is still a need in the art for improved bearing assemblies with improved surface finishes and methods of making bearing assemblies with improved surface finishes. The present disclosure provides a solution for this need.

SUMMARY OF THE INVENTION

A method of electrodynamically finishing a plain bearing includes electrically separating a bearing housing from a journal shaft with a lubricant disposed on a bearing surface of the bearing housing. The bearing housing or the bearing journal is rotated relative to the other and a voltage differential applied across the bearing housing and the journal shaft. A bearing surface asperity is eroded with electric discharge between the journal shaft and the bearing housing.

In certain embodiments, the method can include mechanically finishing the journal shaft with the bearing housing prior to electrically separating the bearing housing and member. A mechanical load can be communicated between the bearing housing and journal shaft through a lubricant film disposed in the gap. The minimum mechanical separation distance between the bearing housing and the journal shaft can be reduced.

In accordance with certain embodiments, the journal shaft can be translated relative to the bearing housing. The journal shaft can be rotated relative to the bearing housing. The bearing housing can be rotated relative to the journal shaft. A journal member or a thrust member can be rotated relative to the bearing housing. The bearing housing can be rotated relative to the journal member. The bearing housing can be rotated relative to the thrust member.

It is contemplated that an alternating current (AC) voltage differential can be applied across bearing housing and journal shaft. The voltage differential can be removed based upon a comparison of one or more of a lubricant property, load, temperature, and rotational speed with a selected value. The bearing surface can be smoothed by reduction of asperities disposed on the bearing surface. Carbide or metallic asperities disposed on the bearing surface can be vaporized.

A plain bearing assembly includes a bearing housing with a bearing surface and a journal shaft. The journal shaft is supported on the bearing surface with a lubricant disposed between the journal shaft and the bearing surface. The bearing surface has an electrodynamically eroded surface portion finished to the journal shaft.

In certain embodiments the plain bearing assembly can include a journal bearing or a thrust bearing. The bearing housing and/or the journal shaft can include a metallic material. The bearing housing and/or the journal shaft can include a carbide-containing material. A bearing housing lead can be electrically connected to the bearing housing. A journal shaft lead can be electrically connected to the journal shaft. Journal shaft and bearing housing leads can be connected to the bearing housing and journal shaft. A voltage source can be connected to the plain bearing assembly.

In accordance with certain embodiments, the voltage source can be an AC voltage source. A positive terminal of the voltage source can be connected to the journal shaft. A negative terminal of the voltage source can be connected to the bearing housing. A mechanical load can be coupled through the bearing assembly to a static structure. The mechanical load can include a rotor. A rotation source can be connected to the rotor.

A motor assembly includes a rotor and a stator. The bearing housing and the journal shaft include a carbide-containing metallic material. A minimum lubricant-film distance between the bearing surface and the journal is defined between an electrodynamically eroded asperity and the journal shaft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIGS. 3A-3H are schematic cross-sectional views of a bearing surface of the bearing housing and journal member of FIG. 1, showing the bearing housing bearing surface being finished to the journal member;

DETAILED DESCRIPTION OF THE PREFERRED EMBODIMENTS

Figure 1:
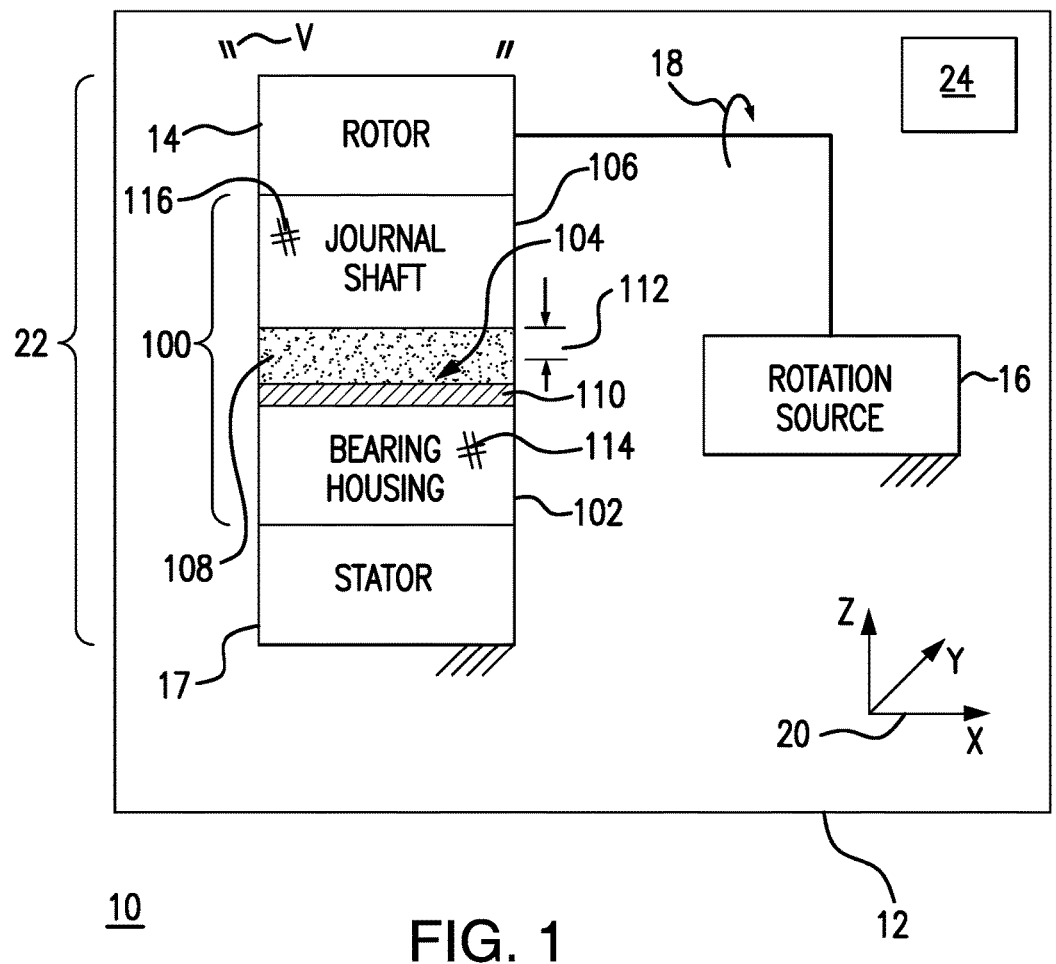
FIG. 1 is a schematic view of an exemplary embodiment of a motor assembly constructed in accordance with the present disclosure, showing a plain bearing assembly supporting a rotor for rotation relative to a stator.

Reference will now be made to the drawings wherein like reference numerals identify similar structural features or aspects of the subject disclosure. For purposes of explanation and illustration, and not limitation, a partial view of an exemplary embodiment of a plain bearing assembly in accordance with the disclosure is shown in FIG. 1 and is designated generally by reference character 100. Other embodiments of plain bearing assemblies, methods of electrodynamically finishing bearing assemblies and in machinery having electrodynamically finished bearing assemblies in accordance with the disclosure, or aspects thereof, are provided in FIGS. 2-6, as will be described. The systems and methods described herein can be used in rotating machinery, such as in electric motors or generators for aircraft, though the present disclosure is not limited to electric motors and generators or to aircraft in general.

Referring to FIG. 1, a vehicle 10, e.g., an aircraft, is shown. Vehicle 10 includes a static structure 12, a rotation source 16, and a motor assembly 22. Motor assembly 22 includes a rotor 14 supported for rotation relative to a stator 17 by plain bearing assembly 100. Stator 17 is fixed relative to rotor 14 and is operatively connected to rotation source 16 to receive rotation 18 from rotation source 16. Rotation source 16 is operably connected to rotor 14 for applying and controlling rotation 18 applied to rotor 14, such as for running in plain bearing assembly 100 during a finishing and/or matching operation, as will be described. Rotor 14 is supported for rotation relative to stator 17 by plain bearing assembly 100 about rotation axis 20, e.g., about the x-axis. Although described herein in the context of an exemplary motor assembly, those of skill in the art will appreciate that the present disclosure is also applicable to motor assemblies.

Plain bearing assembly 100 includes a bearing housing 102 with a bearing surface 104 and a journal shaft 106. Journal shaft 106 is supported on bearing surface 104 with a lubricant 108 disposed between journal shaft 106 and bearing surface 104. Bearing surface 104 has an electrodynamically eroded surface portion 110 finished such that surface portion 110 is matched to journal shaft 106. In this respect surface portion 110 has one or more electrodynamically eroded asperity 122 (shown in FIG. 3C) to reduce width of a lubricant-film gap 112 defined between bearing housing 102 and journal shaft 106 with associated minimized whirl and electro-hydrodynamic (EHD) speed. As used herein the degree to which surface portion 110 conforms to bearing surface 104 is considered a continuum extending from relatively coarse mechanically matched to relatively fine electrodynamically matched, mechanically run-in and electrodynamically finished between mechanically matched and electrodynamically matched, mechanically run-in being closer to mechanically run-in and electrodynamically finished being closer to electrodynamically matched. Although shown and described herein as being disposed on bearing housing 102, it is to be understood and appreciated that journal shaft 106 can also have an electrodynamically eroded surface portion extending about its circumference formed coincidently with electrodynamically eroded surface portion 110.

Lubricant-film gap 112 is occupied at least in part by lubricant 108. A portion of lubricant 108 is disposed between rotating journal shaft 106 and electrodynamically surface portion 110. Examples of suitable lubricants include hydrodynamic oils with viscosities dependent upon bearing rotational speed, oil temperature, and load, having dielectric breakdown strength suitable for controlled erosion of race surfaces at relative low voltages at lubricant-film thicknesses present in mechanically matched bearing assemblies.

In the illustrated exemplary embodiment journal shaft 106 be formed from a metallic material 114 and that bearing housing 102 be formed from metallic material 116. It is contemplated that one or more of metallic material 114 and metallic material 116 can a carbide-containing metallic material. In accordance with certain embodiments, metallic material 114 and metallic material 116 can be formed from similar or substantially equivalent metallic alloy compositions. Examples of suitable metallic materials include carbon martensitic stainless steels and austenitic stainless steels.

Rotor 14 is fixed relative to journal shaft 106 and bearing housing 102, and is fixed relative to stator 17. Rotation source 16 is operably connected to rotor 14 for applying rotational energy to rotor 14. As will be appreciated by those of skill in the art in view of the present disclosure, rotor 14 can be fixed to bearing housing 102 and journal shaft 106 fixed relative to stator 17, as suitable for an intended application.

In the illustrated exemplary embodiment plain bearing assembly 100 supports rotor 14 within motor assembly 22 with lubricant 108 disposed between bearing housing 102 and journal shaft 106. As will also be appreciated by those of skill in the art in view of the present disclosure, vibration V associated with rotation of rotor 14 about rotation axis 20 couples to stator 17, and therethrough to static structure 12 through plain bearing assembly 100 and can influence performance of devices carried by vehicle 10, such as an exemplary imaging device 24. Asperities, e.g., electrodynamically eroded asperity 122 (shown in FIG. 3C) define the minimum gap width of lubricant-film gap 112, larger gap widths corresponding with vibration V of larger magnitudes, e.g., by allowing a supported journal shaft to depart a geometrically centered rotation axis during rotation, e.g., with wobble 26 (shown in FIG. 2). Reducing the minimum value of lubricant-film gap 112 by electrodynamically eroding asperities disposed on bearing housing 102, e.g., asperity 122, reduces whirl, EHD rotational speed, and magnitude of vibration V. This can improve performance and reliability of devices carried by vehicle 10, e.g., imaging device 24.

Figure 2:
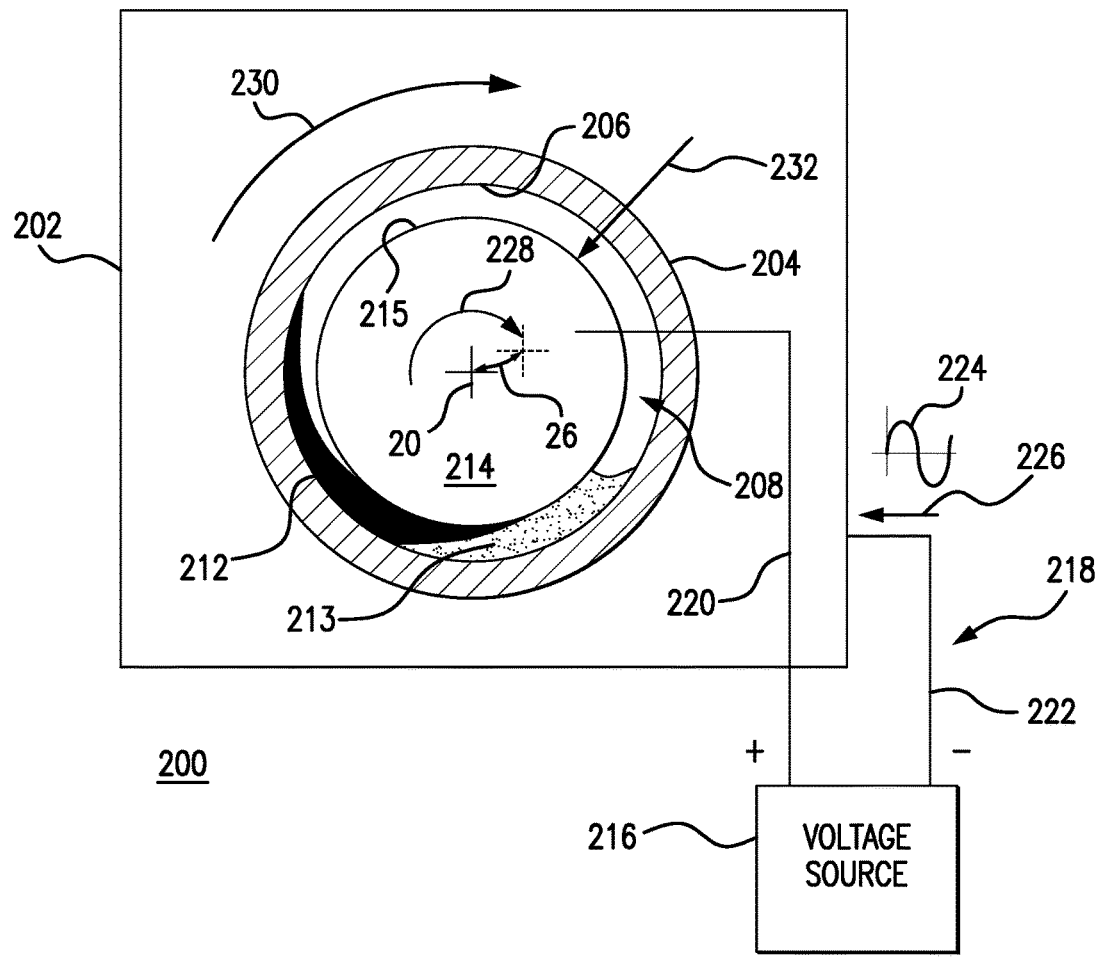
FIG. 2 is a cross-sectional side view of the bearing assembly of FIG. 1, showing a voltage source connected to a bearing housing and journal shaft of the bearing assembly for eroding asperities on the bearing race surfaces using electrical discharge events therebetween.

With reference to FIG. 2, a journal bearing assembly 200 is shown. Journal bearing assembly 200 includes bearing housing 202 with a sleeve 204 having bearing surface 206 and a journal land 208 with a journal 214. Journal land 208 is radially supported for rotation about rotation axis 20 on bearing surface 206 by a lubricant 213 disposed between journal land 208 and bearing surface 206. At least a portion of bearing surface 206 has an electrodynamically eroded surface portion 212 which is matched to the axial profile of a journal 214 of journal land 208.

A voltage source 216 for forming electrodynamically finished bearing surface portion 212 is connected to journal bearing assembly 200. In this respect voltage source 216 is connected to journal bearing assembly 200 through a finishing circuit 218. Finishing circuit 218 includes a journal shaft lead 220 and a bearing housing lead 222. Journal shaft lead 220 is connected to a positive terminal of voltage source 216 and bearing housing lead 222 is connected to a negative terminal of voltage source 216 to apply a voltage differential (illustrated with positive and negative symbols at voltage source 216) across sleeve 204 and journal 214. The voltage differential can be an AC voltage differential 224. The voltage differential can be a DC voltage differential 226. AC voltage differentials can reduce asperities on both journal land 208 and bearing surface 206. DC voltage differentials can reduce asperities on bearing surface 206 relative rapidly due to the constant polarity of the voltage differential.

Once finishing circuit 218 is established and voltage differential applied, one of journal 214 and bearing housing 202 is rotated relative to the other. For example, journal 214 can be rotated relative to bearing housing 202 as shown with arrow 228. This concentrates finishing locally at a region of bearing housing when journal 214 is proximate to bearing surface 206. Bearing housing 202 can be rotated relative to journal 214 as shown with arrow 230. This uniformly finishes bearing surface 206 to journal land 208 about substantially the entire circumference of bearing surface 206. In certain embodiments a load 232 can be applied to between journal 214 and bearing housing 202, affecting the time required for finishing by reducing the radial distance occupied by lubricant-film gap 112 (shown in FIG. 1) between bearing surface 206 and journal land 208, and enabling reduction of asperities disposed on bearing surface 206 to occur at lower voltage differentials.

In certain embodiments, the voltage differential between bearing surface 206 and journal surface 215 can be applied statically. In this respect it is contemplated that the electrical isolation of journal 214 and/or bearing housing 202 can be interrupted. Interruption of the electrical isolation, such as by grounding only one of journal 214 and bearing housing 202, allows the element with the interrupted electrical isolation to develop a static charge from flow of lubricant 213 across the element. When static charge builds up sufficient to overcome the dielectric breakdown strength of lubricant between journal surface 215 and an asperity on bearing surface 206 an electrical discharge event occurs, reducing the asperity by vaporizing material forming the asperity, thereby smoothing bearing surface 206.

With reference to FIGS. 3A-3H, formation of electrodynamically eroded surface portion 110 is shown. As shown in FIG. 3A, at the beginning of the finishing (or electrodynamic run-in process) one of bearing housing 102 and journal shaft 106 are rotated relative to the other. A voltage differential is applied across a lubricant-film gap 112 separating bearing housing 102 and journal shaft 106. The voltage differential can be developed statically, by connection of a DC voltage source to plain bearing assembly 100, or by connection of an AC voltage source to plain bearing assembly 100.

When the potential difference exceeds the dielectric breakdown strength associated with a minimum width of lubricant-film gap 112 an electrical discharge event 120 occurs between an asperity 122 bounding the lubricant-film gap 112, as shown in FIG. 3B. Electrical discharge event 120 removes material from asperity 122. Removal of the material reduces height of asperity 122 via erosion, smoothing surface portion 110 and reducing the minimum width of lubricant-film gap 112, as shown in FIG. 3C. Erosion can be via vaporization 126 (shown in FIG. 3B), the vaporized material originating from a carbide inclusion 124 and metallic material 114 forming bearing housing 102.

As shown in FIG. 3D, as the dominant asperities are eroded the finishing process becomes dominated by electric discharge events 130. Electric discharge events 130 are more frequent and of lower voltage, as shown in FIG. 3D due to the minimum lubricant-film thickness becoming smaller due the erosion of asperities on surface portion 110. These lower voltage and higher frequency electrical discharge events 130 result in a progressive smoothing of surface portion 110, as shown in FIGS. 3E-3H. It is contemplated that this process can continue until a minimum width of lubricant-film gap 112 reaches a sweet spot in the process window, as shown in FIG. 3F, e.g., where the voltage differential is no longer sufficient to vaporize remaining asperities on surface portion 110. This sweet spot can be determined experimentally, associated with a rotational speed target for a given amount of input torque for example, to provide a process control mechanism for the finishing process. Alternatively or additional, finishing can continue until a selected discharge voltage target 132 (shown in FIG. 3H), discharge frequency 136 (shown in FIG. 3G), and/or lubricant temperature target 138 (shown in FIG. 3H) is reached.

Figure 4:
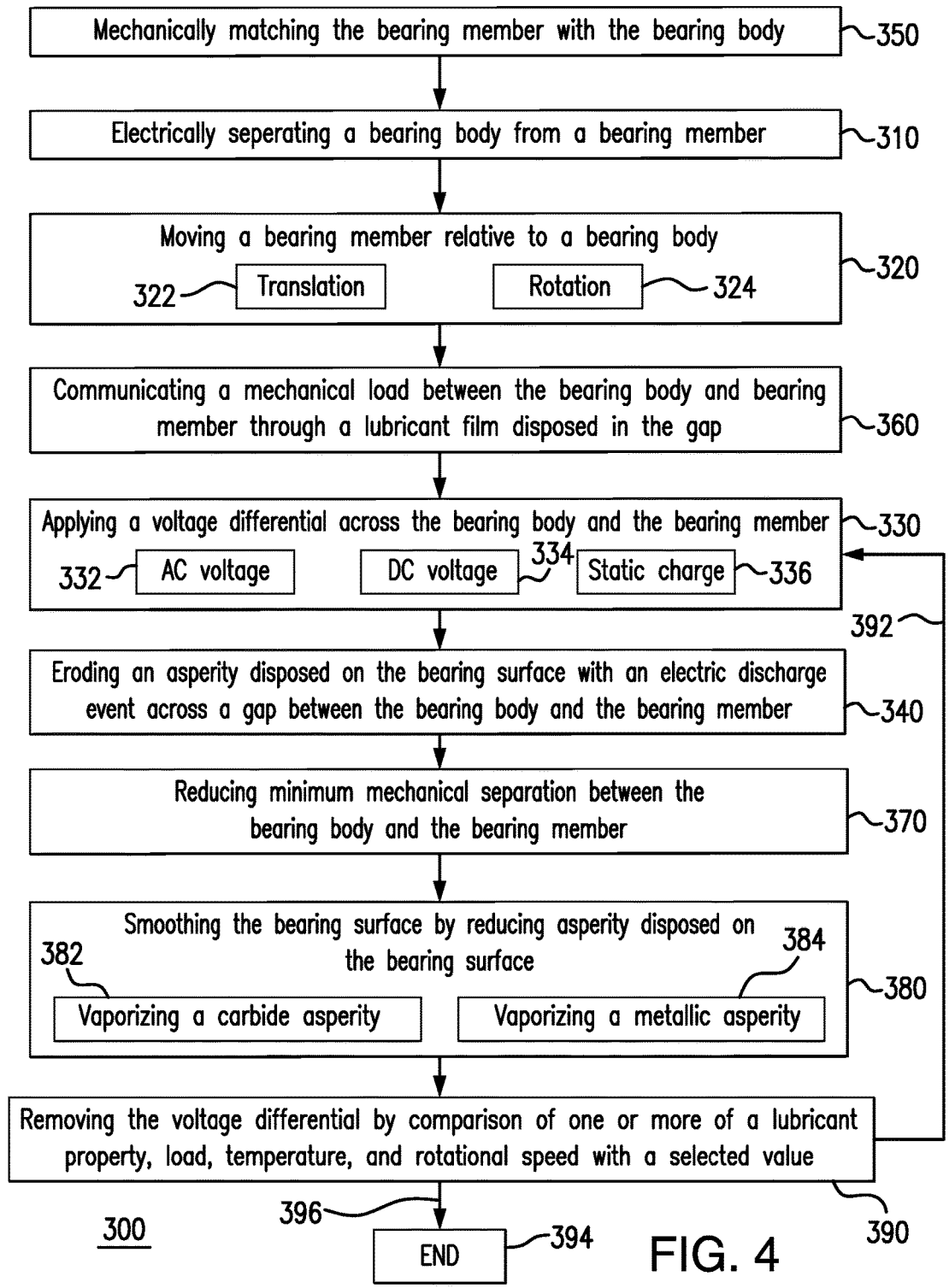
FIG. 4 is process flow diagram of a method of finishing a bearing housing to a journal shaft according to the present disclosure, showing the steps of the method.

Referring now to FIG. 4, a method 300 of electrodynamically finishing a plain bearing assembly, e.g., plain bearing assembly 100, is shown. Method 300 generally includes electrically separating a bearing housing, e.g., bearing housing 102 (shown in FIG. 1), from a journal shaft, e.g., journal shaft 106 (shown in FIG. 1), with a lubricant disposed on a bearing surface of the bearing housing, as shown with box 310. The bearing housing or the journal shaft is moved relative to the other as shown with box 320, such as by relative translation 322 or relative rotation 324 of one of the bearing housing and journal shaft relative to the other of the bearing housing and journal shaft. A voltage differential is then applied across the bearing housing and the journal shaft, as shown with box 330, and bearing surface asperities are eroded with electric discharge events between the journal shaft and the bearing housing, as shown with box 340. It is contemplated that the voltage differential can be an AC voltage differential, as shown with box 332, a DC voltage differential, as shown with box 334, or a by developing a static charge on the journal shaft or bearing housing, as shown with box 336.

In certain embodiments, the journal shaft and bearing housing are mechanically matched to one another and assembled into the plain bearing assembly prior to electrically separating the bearing housing and journal shaft, as shown with box 350. A mechanical load, e.g., load 232 (shown in FIG. 2), can be communicated between the bearing housing and journal shaft through a lubricant film disposed in the gap while the voltage differential is applied, as shown with box 360. It is contemplated that the minimum mechanical separation distance between the bearing housing and the journal shaft, e.g., lubricant-film gap 112 (shown in FIG. 1), can be reduced during erosion, as shown with box 370. Method 300 can include smoothing the bearing surface by reducing one or more asperity disposed on the bearing surface, as shown with box 380. Erosion can include vaporizing either or both of carbide-containing asperities, as shown with box 382, and metallic material forming the asperities, as shown with box 384.

It is contemplated that the voltage differential can be removed based upon a comparison of one or more of a lubricant property, load, temperature, and rotational speed with a selected value, as shown by box 390. When the comparison indicates that the selected value has not been reached application of the voltage differential continues, as shown with arrow 392. When the comparison indicates that the selected value has been reached the voltage differential is removed, as shown with box 394 and arrow 396. The plain bearing assembly is thereafter considered 'run-in' such that the leads can physically be removed and the assembly incorporating the plain bearing assembly fully employed in its intended use.

Figure 5:
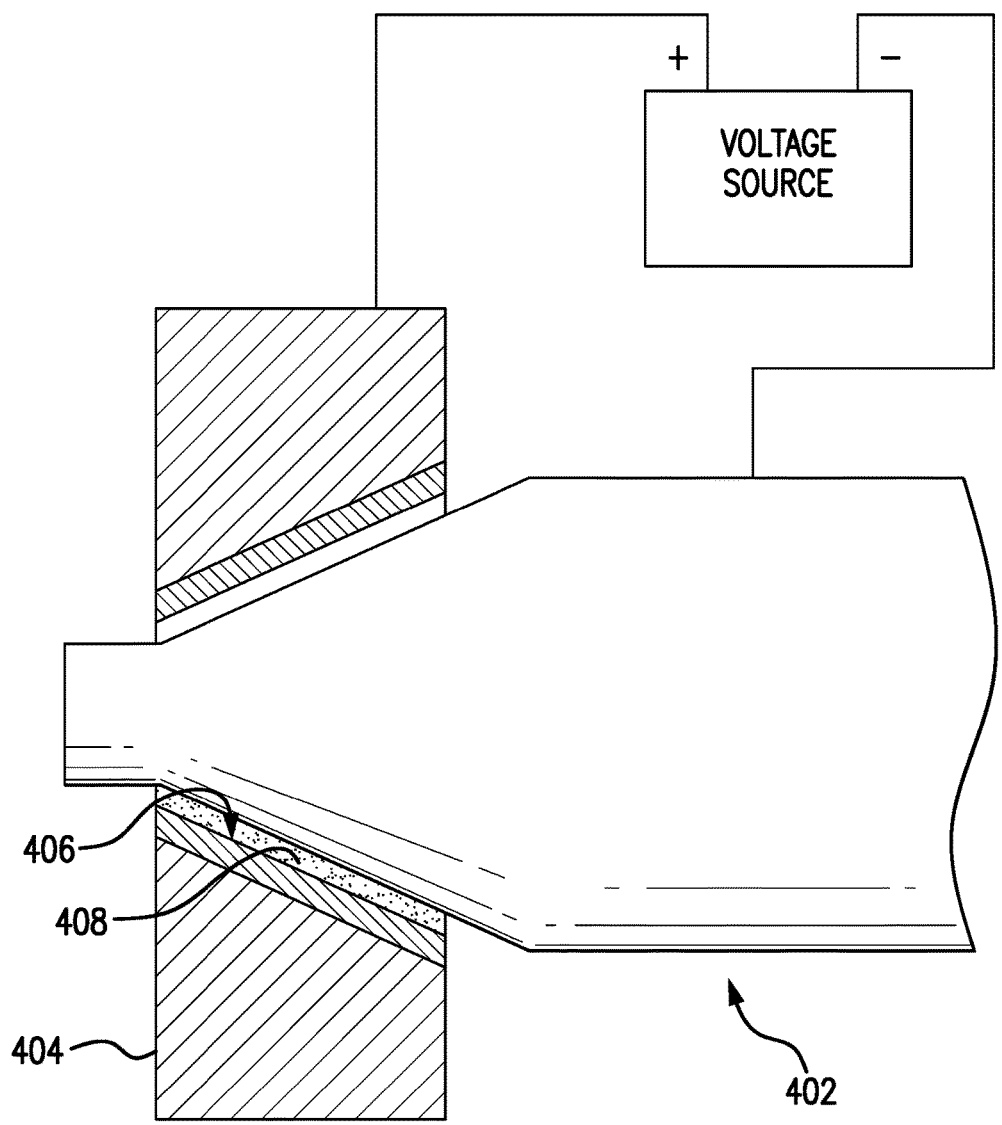
FIG. 5 is cross-sectional view of another embodiment of the plain bearing assembly of FIG. 1, showing a thrust bearing with an electrodynamically finished bearing surface.

With reference to FIG. 5, a thrust bearing assembly 400 is shown. Thrust bearing assembly 400 is similar to journal bearing assembly 200 (shown in FIG. 2) and additionally includes a tapered thrust journal shaft 402 that is supported for rotation against a thrust bearing housing 404. Thrust bearing housing 404 has a bearing surface 406 that is conjugate to tapered thrust journal shaft 402 and has an electrodynamically finished surface portion 408. Electrodynamically finished surface portion 408 allows thrust bearing housing 404 to handle larger loads that otherwise possible owning the improved bearing surface smoothness and reduced friction resulting from electrodynamically finishing tapered journal shaft 402 with thrust bearing housing 404.

Figure 6:
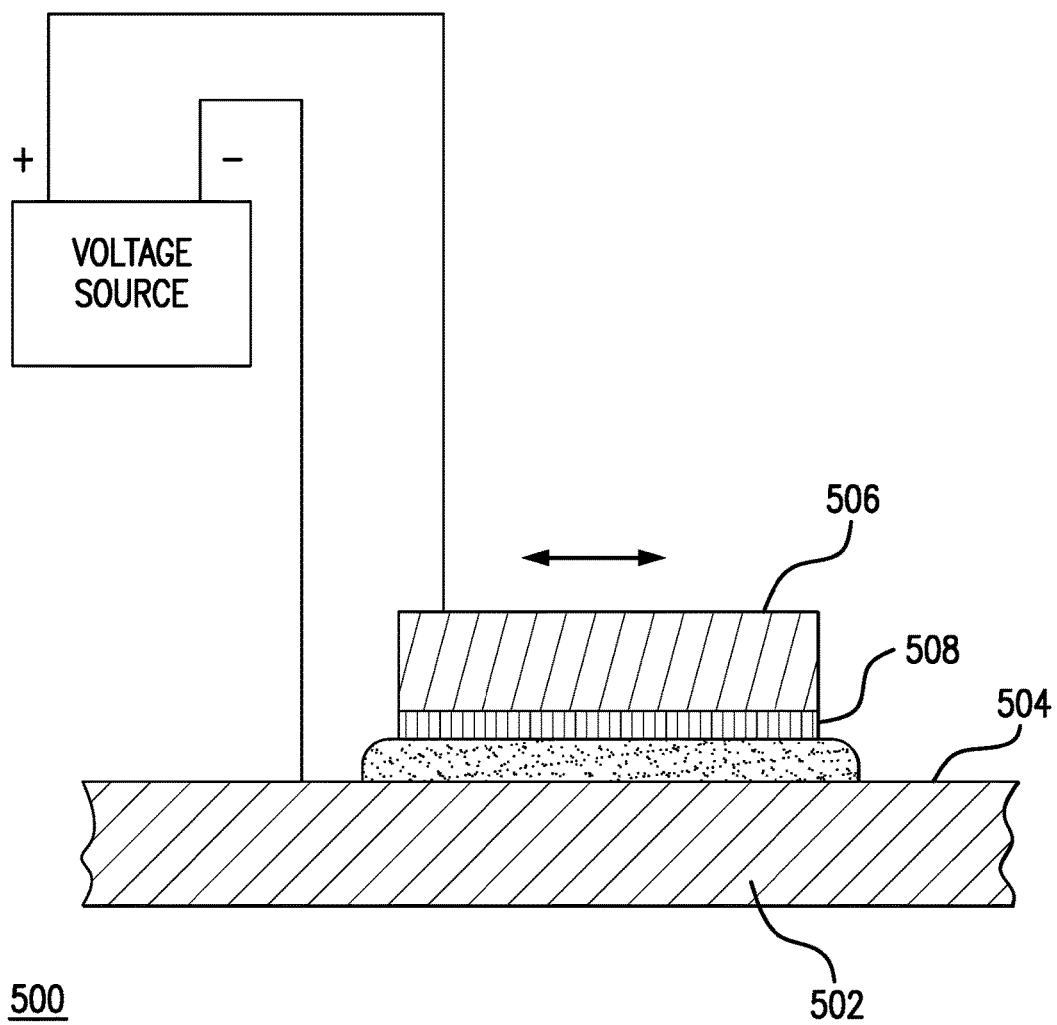
FIG. 6 is cross-sectional view of yet another embodiment of a plain bearing assembly, showing a linear bearing having linear bearing housing with a bearing surface finished to a plate body carrying a load.

With reference to FIG. 6, a linear bearing assembly 500 is shown. Linear bearing assembly 500 is similar to journal bearing assembly 200 (shown in FIG. 2) and additionally includes a linear bearing housing 502 with a planar surface 504 and a plate body 506 with a planar electrodynamically eroded surface portion 508. Electrodynamically eroded surface portion 508, shown as including the entirety of the contacting area between plate body 506 and linear bearing housing 502, makes plate body 506 more closely match finished planar surface 504, reducing minimum lubricant-film thickness therebetween, improving load-carrying capability of linear bearing assembly 500 by reducing friction and surface finish imperfections between plate body 506 and linear bearing housing 502.

Plain bearings generally include a shaft or journal that rotates freely in a supporting metal sleeve or shell, or a movable plate supported on a guide plate. Some plain bearings can include form or finish errors in the raceway due to machining process limitations. The form errors can cause in undesirable lubricant whirl and/or retarded EHD layer development, potentially causing excessive wear during startup and/or shutdown. Some of the raceway form or finish errors are the result of high-hardness inclusions in the race material, such as carbides, which are harder than the surrounding bearing material, like steel. Such inclusions can be smeared during honing or polishing of the bearing surface, resulting in bearing surface artifacts like "honing lines" and roughness.

In embodiments described herein, electrical discharge across the EHD between the bearing housing and bearing housing is used to improve smoothness of the bearing surface by reducing (or removing entirely) form error and improving the bearing surface finish. The improved smoothness reduces oil whirl potential and allows for lower hydrodynamic speeds during startup and shutdown, reducing metal-to-metal wear that can occur during star-up and shutdown. It is contemplated that the smoothing process be controlled using one or more of lubricant properties, load, temperature, rotational speed, voltage magnitude, and voltage rise time during the electrical discharge smoothing process.

Electrical discharge erosion is a phenomenon in bearings where a voltage across a journal shaft and bearing housing discharges when the film thickness between the journal shaft and bearing housing is less than the corresponding discharge gap based on the lubricant dielectric constant. At high voltages electrical discharge can have magnitude sufficient to destructively pit, crater, erode, and potentially reduce the reliability of the plain bearing assembly by making the bearing surface less smooth. Plain bearing assemblies are therefore generally electrically grounded, the shaft fixed to the journal shaft being electrically or the bearing housing being electrically isolated.

Applicants have come to appreciate that, at relatively low voltages and with suitable control, electrical discharge can constructively smooth the bearing surface. In particular, the bearing surface can be gently eroded at localized high spots in a compensatory manner, thereby reducing (or eliminating entirely) form error and artifacts in the bearing surface from the surface honing and polishing processes typically used to define the bearing surface finish. This results in a smoother bearing surface that otherwise possible with conventional honing techniques, allowing the lubricant-film in the bearing assembly to be established at lower rotational speeds, reducing (or eliminating) startup and shutdown wear. The in-situ finishing and/or matching can also compensate for some amounts of alignment and/or installation error in bearing assembly and/or end item housing the bearing assembly.

Without wishing to be bound to a specific theory, it is understood that the electrical discharge process is compensatory because erosion occurs preferentially in high stress regions of the bearing surface that in low stress regions of the bearing surface. The smoothing arises out of low voltage electrical discharge events occurring between the highest asperities of the bearing surface and journal shaft, the localized nature of a given asperity causing a given electrical discharge event to generate heat sufficient to vaporizes asperity peak, thereby smoothing the bearing surface. Advantageously, carbides in the bearing surface material are affected at nearly the same rate as the steel material, which prevents the smearing that can accompany removal of such carbides in conventional abrasive honing processes.

In accordance with certain embodiments, the smoothing can be done in-situ. In this respect the journal shaft and bearing housing can be finished and/or matching to more closely conform to one another subsequent to assembly. Finishing and/or matching can be done, for example, by varying the rotation speeds and temperatures during the initial run-in of the bearing—either on a test stand or subsequent to installation into an end item—thereby affecting the lubricant film thickness and material erosion rates. In further embodiments, AC voltage magnitude and frequency can be varied to control the material erosion rate to improve (or optimize) the geometric precision and surface finish in the final product. Once the smoothing process is complete and suitable finishing achieved, erosion can be halted by removal of the voltage source and electrically isolating the bearing assembly in the end item housing the bearing assembly to eliminate any further erosion which could otherwise be possible from any induced voltages from the end item or end item environment.

The methods and systems of the present disclosure, as described above and shown in the drawings, provide for bearing assemblies with low disturbances, greater load-carrying capacity, improved fatigue life, and/or smoother bearing surfaces for lower EHD liftoff speeds to reduce metal-to-metal wear at low operating speeds. While the apparatus and methods of the subject disclosure have been shown and described with reference to preferred embodiments, those skilled in the art will readily appreciate that change and/or modifications may be made thereto without departing from the scope of the subject disclosure.

What is claimed is:

1. A method of electrodynamically finishing a plain bearing assembly, comprising:
   electrically separating a bearing housing from a journal shaft with a lubricant disposed on a bearing surface of the bearing housing;
   rotating one of the bearing housing and the journal shaft relative to the other of the bearing housing and the journal shaft;
   applying a voltage differential across the bearing housing and the journal shaft; and
   eroding an asperity disposed on the bearing surface with an electric discharge event across a gap between the bearing housing and the journal shaft.

2. The method as recited in claim 1, further comprising mechanically matching the journal shaft with the bearing housing prior to electrically separating the bearing housing and member.

3. The method as recited in claim 1, further comprising communicating a mechanical load between the bearing housing and journal shaft through a lubricant film disposed in the gap.

4. The method as recited in claim 1, further comprising reducing minimum mechanical separation between the bearing housing and the journal shaft.

5. The method as recited in claim 1, further comprising rotating or sliding the journal shaft.

6. The method as recited in claim 1, further comprising rotating the bearing housing.

7. The method as recited in claim 1, further comprising smoothing the bearing surface by reducing an asperity disposed on the bearing surface.

8. The method as recited in claim 7, wherein smoothing the bearing surface includes vaporizing a carbide asperity disposed on the bearing surface.

9. The method as recited in claim 7, wherein smoothing the bearing surface includes vaporizing a metallic asperity disposed on the bearing surface.

10. The method as recited in claim 1, wherein applying the voltage differential includes applying an alternating current voltage differential across bearing housing and journal shaft.

11. The method as recited in claim 1, further comprising removing the voltage differential by comparison of one or more of a lubricant property, load, temperature, and rotational speed with a selected value.

12. A plain bearing assembly, comprising:
    a bearing housing with a bearing surface; and
    a journal shaft supported on the bearing surface with a lubricant disposed between the journal shaft and the bearing surface, wherein the bearing surface has an electrodynamically eroded surface portion finished to the journal shaft.

13. The plain bearing assembly as recited in claim 12, wherein the plain bearing assembly includes a journal bearing or a thrust bearing.

14. The plain bearing assembly as recited in claim 12, further comprising a lead electrically connected to the bearing housing.

15. The bearing assembly as recited in claim 12, further comprising a lead electrically connected to the journal shaft.

16. The bearing assembly as recited in claim 12, further comprising an alternative current (AC) source with a positive and a negative terminal, wherein the positive terminal is electrically connected to the journal shaft.

17. The bearing assembly as recited in claim 12, further comprising a rotor fixed relative to the journal shaft; and a stator connected to the bearing housing.

18. The bearing assembly as recited in claim 17, further comprising a mechanical rotation source operably connected to the rotor.

19. The bearing assembly as recited in claim 12, wherein at least one of the bearing housing and the journal shaft comprises a carbide-containing metallic material.

20. A motor assembly, comprising:
    a rotor; and
    a bearing assembly as recited in claim 12, wherein the bearing housing and the journal shaft include a carbide-containing metallic material,
    wherein a minimum lubricant-film distance between the bearing surface and the journal is defined between an electrodynamically eroded asperity and the journal shaft.

* * * * *